United States Patent [19]

Dombrowski et al.

[11] Patent Number: 5,577,748
[45] Date of Patent: Nov. 26, 1996

[54] WHEELCHAIR HAVING FREEWHEEL HANDLE AND BRAKE ASSEMBLY

[76] Inventors: Gregory J. Dombrowski, 805 NE. Green Oaks Blvd., #370, Arlington, Tex. 76006-2217; Jay H. Song, 901 Dawson St., Cedar Hill, Tex. 75102

[21] Appl. No.: 268,921

[22] Filed: Jun. 29, 1994

Related U.S. Application Data

[63] Continuation of Ser. No. 998,004, Dec. 28, 1992, abandoned.

[51] Int. Cl.$^6$ ........................................................ B62M 1/16
[52] U.S. Cl. ........................................ 280/244; 280/250.1
[58] Field of Search .............................. 280/250.1, 211, 280/244, 242.1, 249, 252, 253, 304.13

[56] References Cited

U.S. PATENT DOCUMENTS

| | | | |
|---|---|---|---|
| 3,301,574 | 1/1967 | Good | 280/250.1 |
| 4,274,650 | 6/1981 | Gilles | 280/249 |
| 4,354,691 | 10/1982 | Saunders | 280/250.1 |
| 4,366,964 | 1/1983 | Farcy et al. | 297/DIG. 4 |
| 4,421,336 | 12/1983 | Petrofsky et al. | 280/252 |
| 4,524,988 | 6/1985 | Netznik | 280/242.1 |
| 4,682,784 | 7/1987 | Anderson | 280/244 |
| 4,840,076 | 6/1989 | Brubaker et al. | 74/143 |
| 4,892,323 | 1/1990 | Oxford | 280/250.1 |
| 5,020,818 | 6/1991 | Oxford | 280/250 |
| 5,037,120 | 8/1991 | Parisi | 280/250.1 |
| 5,184,837 | 2/1993 | Alexander | 280/250.1 |

OTHER PUBLICATIONS

Don Kreb's Access to Recreation Catalog (Fall 1992) Advertisement.
"Wheel Chair 1920s"—Stamp (8.4 USA), Advertisement.
Sports 'N Spokes, Thera Sport, Inc. Advertisement, Mar./Apr. 1993, p. 86.
O'Neill, The Miami Herald, "High–tech Help for Disabled At Expo", Oct. 21, 1991.
LaMere, et al, Sports 'N Spokes Reprint, "The History of Sport Wheelchairs—Part I, The Development of the Basketball Wheelchair", Mar.–Apr. '84, pp. 1–4.
LaMere, et al, Sports 'N Spokes Reprint, "The History of Sport Wheelchairs—Part III, The Racing Wheelchair 1976–1983", Jul./Aug. 1984, pp. 1–4.
Walsh, Sports 'N Spokes Reprint, "The Effect of Pushing Frequency on Speed in Wheelchair Sprinting", May/Jun. 1987, pp. 1–2.
Spooren, Sports 'N Spokes Reprint, "The Technical Characteristics of Wheelchair Racing", Nov./Dec. 1981, pp. 1–2.
Sports 'N Spokes, "The Crank" (Advertisement for Alpha Kinetics, Inc.).
Sports 'N Spokes, "Description of Survey Categories", Mar./Apr. 1993, pp. 38–39, 66.
Higgs, (published in The 1984 Olympic Scientific Congress Proceedings, titled "Sport and Disabled Athletes", vol. 9), Propulsion of Racing Wheelchairs, pp. 165–172 and Appendix J. titled Wheelchair Design, pp. 295–297.

*Primary Examiner*—Anne Marie Boehler
*Attorney, Agent, or Firm*—David H. Judson; Brian Walker

[57] ABSTRACT

A wheelchair having a structural frame, a first pair of front, ground-engaging wheels and a pair of fixed drive wheel assemblies, each including a hub is provided. The invention further includes a free floating handle or lever arm rotatably attached to at least one of the drive wheel assemblies. The lever arm engages the hub of each wheel drive assembly through the use of a friction engagement system, thereby enabling propulsive forces to be exerted on the wheelchair to propel the wheelchair in either a forward or rearward direction. The leverage thereby obtained is not limited by the radius of the wheel rim and the amount of leverage desired may be controlled by the user simply by placing the user's grasp at various locations along the lever arm. The lever arm and friction engagement system may also serve as a braking system for the wheelchair.

8 Claims, 4 Drawing Sheets

WHEELCHAIR HAVING FREEWHEEL HANDLE AND BRAKE ASSEMBLY

This is a continuation of application Ser. No. 07/998,004 filed on Dec. 28, 1992 now abandoned.

TECHNICAL FIELD

The present invention relates generally to push handles for use with wheelchairs. In particular, the invention provides a wheelchair having a free floating handle and brake assembly.

BACKGROUND OF THE INVENTION

Conventional wheelchairs have push handrims fixed to the drive wheels. A user propels the wheelchair by grasping the handrims and then exerting a forward stroke. The drive wheels move forward concurrently with the forward thrust made by the user.

Typically, the handrim is attached to the drive wheel either by being bolted or welded to the rim of the wheel. Another manner of attachment is by fixing the handrim to the wheel using the wheel spokes. The diameter of the handrim also determines the amount of leverage the handrim provides the user to engage when propelling the wheelchair. The amount of leverage is determined by the distance the handrim is from the center of rotation. The fact that the handrims are statically fixed to the wheel, however, limits the amount of leverage possible to that of the diameter of the wheel.

Another disadvantage associated with conventional wheelchairs is that they can be quite difficult to maneuver in certain situations. For instance, the most problematic situation is where the user has to confront a steep incline or under other circumstances where forward momentum is lost quickly. Because forward progress requires the user to release the handrim to reach back for another forward stroke, there is a tendency for wasted movement due to the fact that the most direct route between the end of a forward stroke and the beginning of a next forward stroke often is not taken. When a user releases the rim to reach back for another forward stroke, he or she must expend an amount of energy to simply regrasp the handrim. The amount of energy expended regrasping the handrim increases with the steepness of the incline. Such conventional handrim systems are thus quite difficult and often frustrating to use.

Still another disadvantage of conventional wheelchairs is that the wheelchair handrims are often difficult to master for wheelchair users who are physically weak or have little or no experience using wheelchairs. This is because such users expend significant energy concentrating on simply maintaining a grasp of the handrim to facilitate their forward progress. Such handrims are also less satisfactory for sport wheelchairs that are used in racing or the like. Moreover, standard wheelchair handrims do not permit the user to selectively engage an amount of leverage which is appropriate for the terrain being covered.

There has therefore been a long-felt need to overcome these and other problems associated with conventional wheelchairs and wheelchair handrims.

BRIEF SUMMARY OF THE INVENTION

The primary objective of the present invention is to increase the overall efficiency with which a user propels a wheelchair.

It is a more specific object of the invention to provide a wheelchair having a novel mechanism including a lever arm that is useful for both driving and braking the wheelchair.

It is still another object of the invention to provide a wheelchair that includes such a mechanism that is much safer and easier-to-use than prior art wheelchairs.

It is a further object of the invention to provide a mechanism that can be provided as an "add-on" feature to existing wheelchairs to enhance the user's ability to drive and/or brake the wheelchair.

It is a further object of the invention to incorporate a "freewheel" mechanism into the wheelchair drive. The freewheel mechanism cooperates with a lever arm to facilitate the user's driving and/or braking of the wheelchair in an efficient, reliable and safe manner as compared to the prior art. In one embodiment, the lever arm extends from the center of a drive wheel radially outward and thus can be grasped along its entire length. To adjust the leverage, the user simply moves his or her grasp on the arm to distances farther or closer to the center of rotation. This enables the user to engage the most efficient leverage necessary as is dictated by his or her own personal strength and the terrain being covered.

It is still another objective of the invention to provide a free floating or "freewheel" arm of the type previously described which further functions as an integral brake mechanism. Braking is accomplished by engaging appropriate friction or contact surfaces to stop undesired momentum. The combination of the "freewheel" mechanism and the braking function enhance the overall efficiency and safety of the wheelchair.

Another objective achieved by the present invention is the ability of the user to retain his or her grasp on the handle at all times. Typically, when a user grasps a fixed handle of a wheelchair made in accordance with the prior art in order to engage a forward stroke, there is a counteractive force on the momentum of the handle, which is still moving from the previous stroke. The lever arm used in the present invention, however, is not fixed to the wheel. Consequently, the user does not have to release his or her grasp of the arm and this counteractive force is not experienced.

The preferred embodiment of the invention is provided for use with a wheelchair comprising a chassis, a seat and a back rest, a pair of front drive wheels attached to the chassis and positioned below the seat; and a pair of drive wheel assemblies mounted on the chassis on each side of the seat for independent rotation about a horizontal axis, each drive wheel assembly having a center of rotation and including a wheel rim, a tire, a hub having an axle, and a plurality of spokes. According to the invention, the wheelchair further includes drive means attached to the hub of the drive wheel assembly for selectively rotating the associated drive wheel assembly. The drive means typically comprises a drum having a contact surface. A lever arm, which includes a pad having a contact surface, is pivotally mounted on a support. The support includes a bearing ring that surrounds the axle such that the bearing ring and the support is rotatable with respect to the axle.

The arm is movable about the pivot point between first and second lateral positions. In operation, when the user desires to propel the wheelchair in the forward direction, the arm is grasped and moved from the first position to the second position such that the contact surfaces of the arm and drum are engaged. While the contact is maintained, the arm is then rotated in a first direction to cause the wheelchair to advance. At the bottom of the forward stroke, the user simply releases the inward force on the arm, thereby causing the arm to pivot about the pivot point from the second position substantially back to the first position. At this time, the arm is then rotated back to its original position for another forward stroke. Such rotation does not interfere with the forward momentum of the wheelchair, however, because the arm is attached to the bearing ring through the support.

Alternatively, if it is desired to move the wheelchair in a reverse direction, the arm is grasped and moved from the first position to the second position such that the contact surfaces of the arm and drum are engaged. While the contact is maintained, the arm is then rotated in a second opposed direction to cause the wheelchair to move backwards. At the end of the backward stroke, the user simply releases the inward force on the arm, thereby causing it to pivot about the pivot point from the second position substantially back to the first position. At this time, the arm is then rotated back to its original position for another stroke.

If the arm is not rotated either forward or back, however, continued force applied by the user will cause the wheelchair to stop due to the engagement of the contact surfaces.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

Similar reference characters refer to similar parts throughout the several views of the drawings.

DETAILED DESCRIPTION

Figure 1:
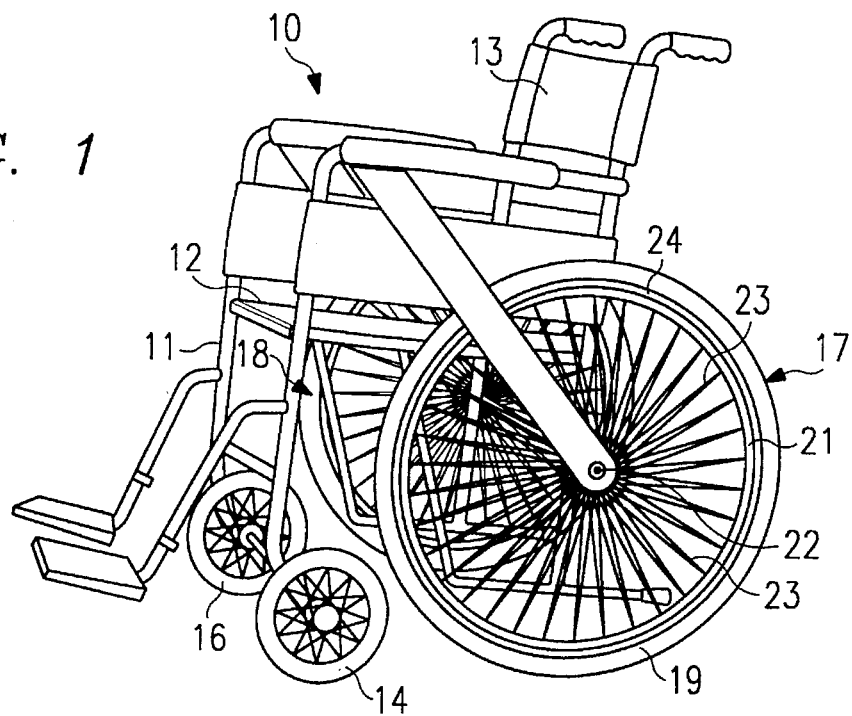
FIG. 1 is a perspective view of a conventional wheelchair with a handrim rigidly secured to each drive wheel.

A conventional wheelchair 10 is shown in FIG. 1 and includes a chassis 11, a seat 12, a back-rest 13, a pair of front, smaller diameter, ground-engaging swivel wheels 14 and 16 terminating below the seat 12, and a pair of back, large diameter, ground-engaging drive wheel assemblies 17 and 18. The seat 12, back-rest 13, front wheels 14 and 16 and drive wheel assemblies 17 and 18 are typically carried by the chassis 11. Typically, the drive wheel assemblies 17 and 18 are mounted on the chassis 11 on each side of the seat 12 for independent rotation about a horizontal axis transverse to and located below the seat 12. Drive wheel assemblies 17 and 18 each comprise a tire 19, a wheel rim 21, a hub 22 having an axle (not shown) and a plurality of spokes 23. A handrim 24 is mounted by brackets or the like concentrically to each wheel rim 21 and spaced slightly outward thereof. The user propels the wheelchair in either a forward or backward direction by grasping one or both handrims and applying torque thereto.

As will be described, the present invention provides improved functionality, ease of operation and safety as compared to prior wheelchair designs. The invention is designed to be incorporated as either original equipment or as an add-on feature for any type of wheelchair having a structural frame and a pair of fixed drive wheels each including a hub. Although it will generally be desired to use the inventive mechanism on each drive wheel assembly, under certain circumstances it may be necessary to use such a mechanism on only one drive wheel assembly.

Figure 1A:
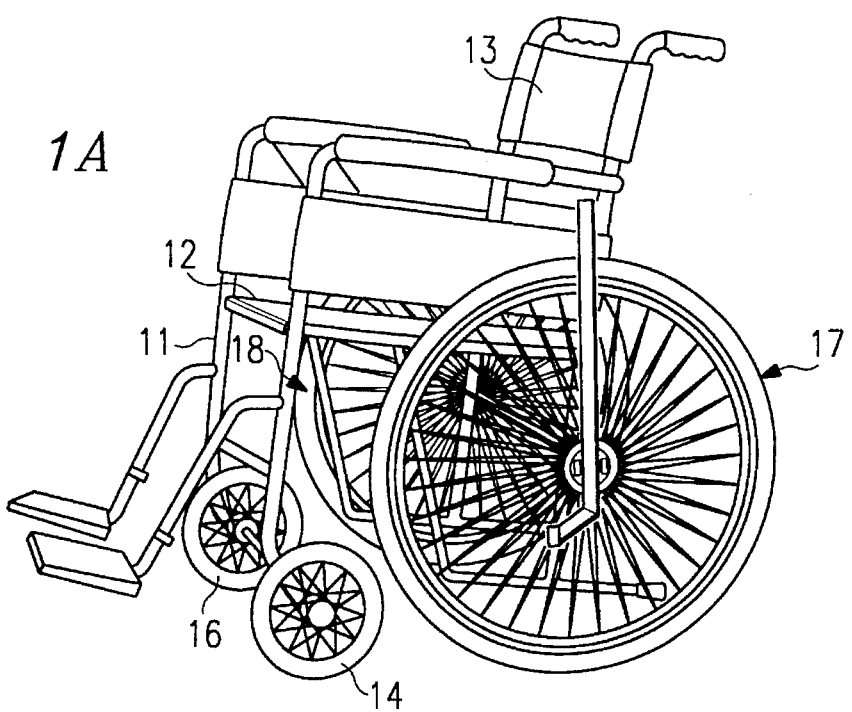
FIG. 1A is a perspective view of a wheelchair having a freewheel handle and brake assembly in accordance with the present invention.

Reference is now had to FIG. 1A which illustrates a wheelchair in accordance with the present invention. The wheelchair depicted in FIG. 1A includes the conventional elements shown in FIG. 1 such as a chassis 11, a seat 12, back-rest 13, a pair of front, smaller diameter, ground-engaging swivel wheels 14 and 16 terminating below the seat 12, and a pair of back, larger diameter, ground-engaging drive wheel assemblies 17 and 18. As with conventional wheelchairs, the seat 12, back-rest 13, front wheels 14 and 16 and drive wheel assemblies 17 and 18 are normally supported by the chassis 11. In accordance with the present invention, however, and as more clearly illustrated in FIG. 2, a handrim 24 is not necessary for propelling the wheelchair in a forward or backward direction.

Figure 2:
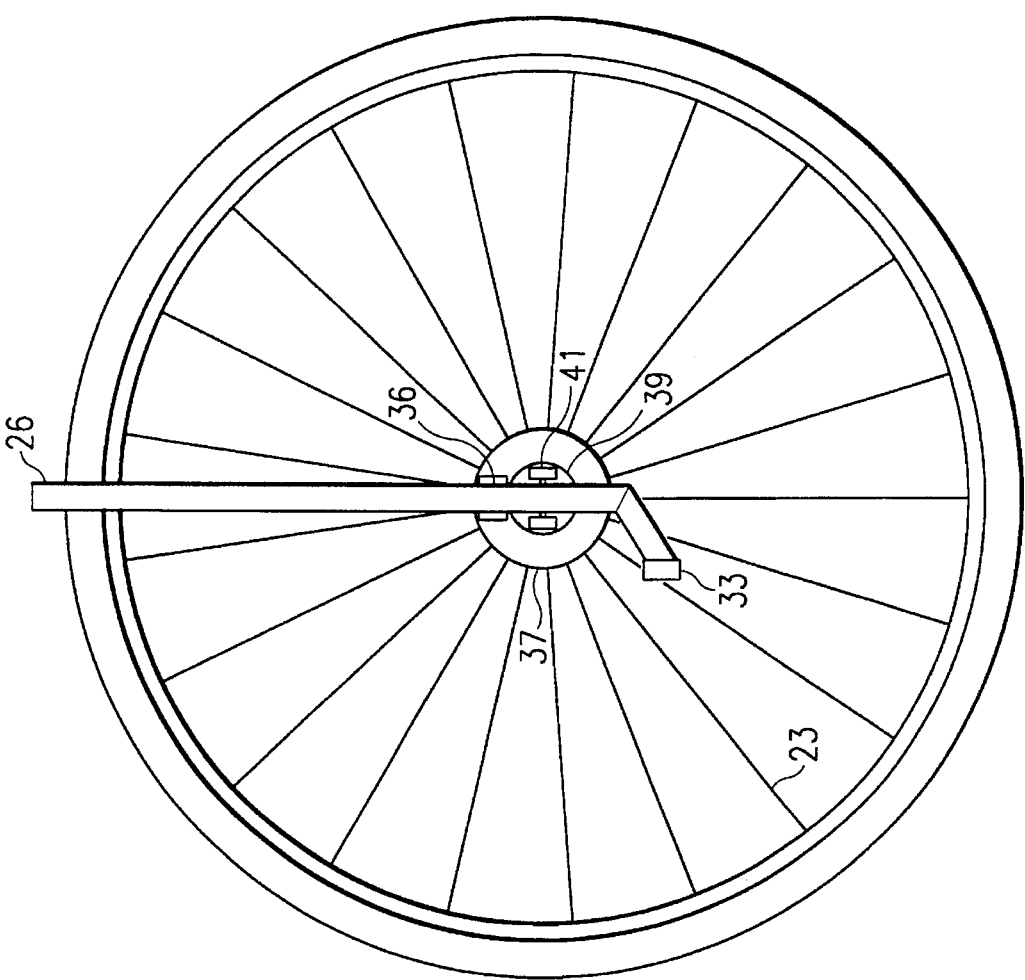
FIG. 2 is a side view of a preferred construction of a lever arm for use in driving a wheelchair according to the present invention.

Referring now to FIG. 2, a side view of a handle or lever arm 26 in accordance with the present invention is depicted. The arm comprises a first portion 28, a second portion 29 attached to an end of the first portion 28, and a counterweight 33 attached to an end of the second portion 29. As can be seen, the second portion 29 is attached to the first portion 28 at an angle of approximately 30–45 degrees to insure that the first portion 28 of the arm remains substantially vertical (as shown in FIG. 2) until grasped by the user. If desired, other initial orientations of the lever arm relative to the ground may be used and the present invention is not intended to be limited to any particular orientation although for convenience, however, the remainder of the discussion assumes the FIG. 2 orientation as the resting position of the lever arm. The actual torque supplied varies depending on where the user grasps the lever arm along the length of the first portion 28.

Figure 3:
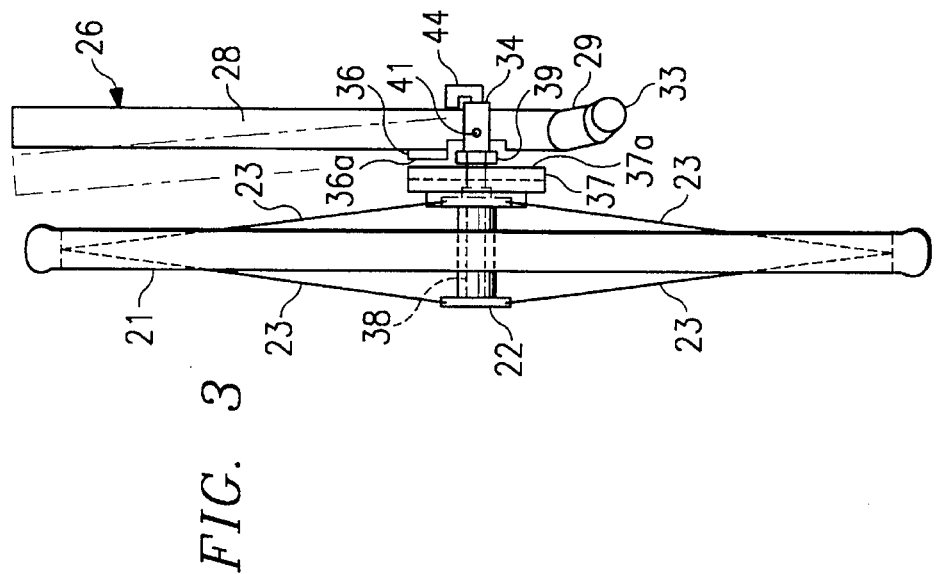
FIG. 3 is a rear view of the construction shown in FIG. 2.

Referring now simultaneously to FIGS. 2–3, the wheelchair further includes drive means attached to the hub of the drive wheel assembly for selectively rotating the associated drive wheel assembly. The drive means typically comprises a drum 37 having an contact surface 37a. A bearing ring 39 is rotatable on the axle 38. Attached to the bearing ring 39 is a support bracket 34. Alternatively, and as described in more detail below, the bearing ring may be supported within a support bracket. The lever arm 26, which includes a pad 36 having a contact surface 36a, is pivotally mounted on the support bracket 34 via pivot hinges 41. Bearing ring 39 surrounds the axle such that the bearing ring and the support bracket is rotatable with respect to the axle.

The arm 26 is movable about a pivot point (formed by the pivot hinges) between first and second lateral positions. The first position is shown in FIG. 3 by the position of the arm; the second position is shown in phantom. Thus the first and second lateral positions are separated by just a few degrees. In operation, when the user desires to propel the wheelchair in the forward direction, the arm 26 is grasped and moved from the first position to the second position such that the contact surfaces 36a and 37a of the arm and drum are engaged. While the contact is maintained, the arm is then rotated in a first direction (i.e., clockwise) to cause the wheelchair to advance. At the bottom of the forward stroke, the user simply releases the inward force on the arm, thereby causing the arm to pivot about the pivot point from the second position substantially back to the first position. At this time, the arm is then rotated back to its original position for another forward stroke. Such rotation does not interfere with the forward momentum of the wheelchair, however, because the arm is attached to the bearing ring 39 through the support bracket 34.

Alternatively, if it is desired to move the wheelchair in a reverse direction, the arm 26 is grasped and moved from the first position to the second position such that the contact surfaces of the arm and drum are again engaged. While the contact is maintained, the arm is then rotated in a second opposed direction (i.e., counterclockwise) to cause the wheelchair to move backwards. At the end of the backward stroke, the user simply releases the inward force on the arm, thereby causing it to pivot about the pivot point from the second position substantially back to the first position. At this time, the arm is then rotated back to its original position for another stroke.

If the arm is not rotated either forward or back, however, continued force applied by the user will cause the wheelchair to stop due to the engagement of the contact surfaces 36a and 37a.

Thus, when the lever arm is pivotally inward toward wheel rim 21, contact is made between the pad 36 of lever arm 26 and the drum 37. The drum 37 is fixed statically to the wheel in any convenient manner. Upon such contact, the lever arm 26 is essentially clutching or engaging the hub and wheel rim. Accordingly, when a forward or backward force is applied to the lever arm while simultaneously maintaining the inward lateral force, the wheel will move in either the forward or backward motion. The lever arm 26 also floats freely upon the axle 38 due to its attachment to support bracket 34, which in turn also floats freely about axle 38 but is maintained thereon by the sealed bearing ring 39.

In contrast to conventional wheelchairs, the leverage obtained with a wheelchair in accordance with the present invention is not limited by the radius of wheel rim 21. Therefore, greater leverage is possible using the inventive wheelchair. Additionally, the amount of leverage may be more accurately controlled through placement of the user's grasp at various locations along the lever arm 26. Moreover, because of the bearing ring, the user is not required to release his or her grasp on the lever arm 26 prior to engaging another propulsive force upon drive wheel assemblies 17 and 18. As a result, the user has increased control over the speed and direction of the wheelchair while it is in motion.

Due to the presence of counterbalance weight 33 attached to the bottom of lever arm 26, lever arm 26 remains in an upright position when not in use, thereby making the arm 26 readily accessible to the user. In addition, the counterbalance weight 33 prevents the lever arm 26 from rotating into a position where it might otherwise strike the ground. The counterbalance weight is also preferably sized and positioned in any convenient manner so as to apply a slight outward force to the arm lever arm 26 so that the arm has a natural tendency to move toward the first lateral position when released. As seen in FIG. 3, a restraining bar 44 can be optionally provided to prevent lever arm 26 from pivoting outward in a lateral direction to an undesired degree.

As noted above, propulsive movements with the lever arm 26 may be accomplished in either a forward or rearward direction as preferred by the user by engaging the pad 36 and the drum 37. The friction engagement of the contact surfaces 36a and 37a also advantageously serves a braking function. This is accomplished simply by applying an inward lateral force on arm 26 without the additional backward or forward force used to obtain the propulsive movements discussed above. In such case, the friction surfaces are engaged to stop undesired momentum.

Figure 4:
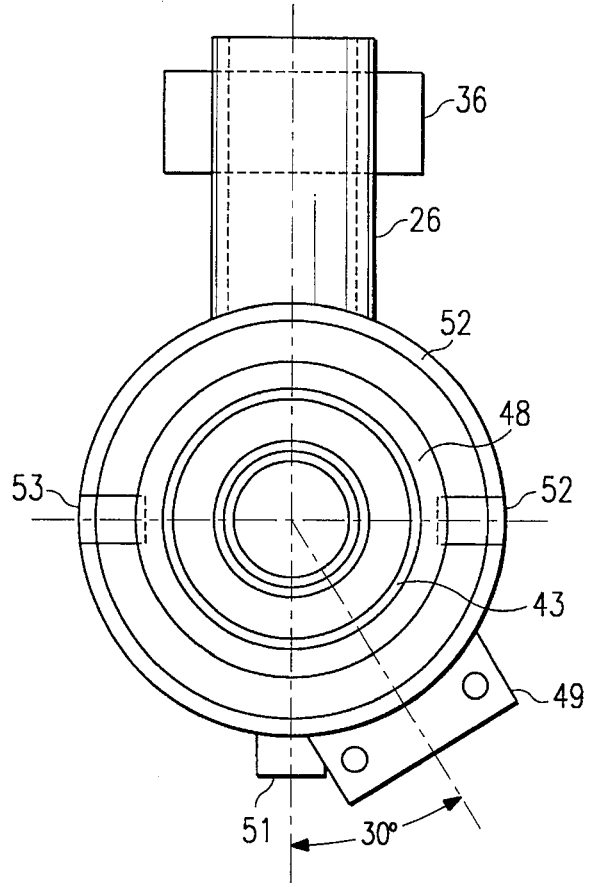
FIG. 4 is a side view of a preferred embodiment of the support assembly used to support the lever arm.
Figure 5:
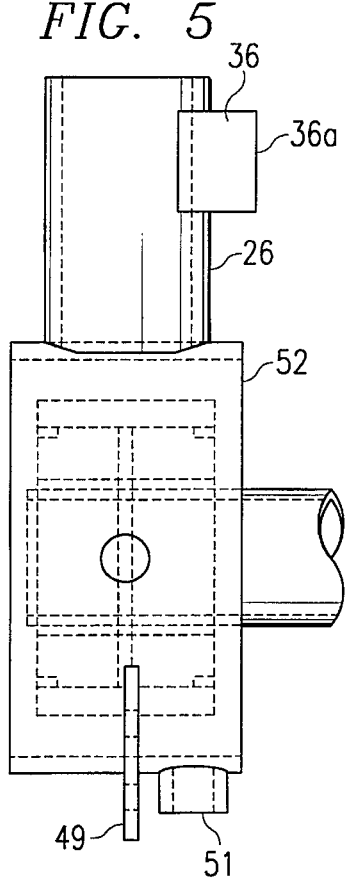
FIG. 5 is a rear view of the mechanism illustrated in FIG. 4.

FIGS. 4–5 depict an alternate, yet preferred embodiment of the assembly used to support the lever arm for pivotally movement. In this embodiment, the bearing ring is located within the support bracket itself and the lever arm is attached thereto as well. The bearing ring is rotatable on the axle. In particular, as seen in these figures, bearing ring 42 is pressed into a sealed bearing ring shell 48. The inward movement of lever arm 26 is achieved through the attachment of the lever arm 26 to a lever arm yoke 52. The lever arm yoke 52 is capable of pivoting in and out by the swiveling action of the lever arm yoke 52 on the yoke pivot hinges 53, which are attached to the sealed bearing ring shell 48. A mounting bracket 49 is attached to lever arm yoke 52 and is used to support a preferably circular-shaped (when viewed in FIG. 4) counterweight (not shown). The yoke includes an opening 51 through which an adjustment screw or the like is threaded to facilitate selective adjustment of the degree to which the yoke can swivel relative to the shell 48.

Figure 6:
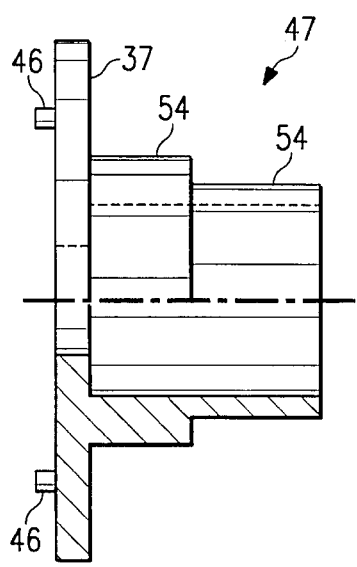
FIG. 6 is a view, partially cutaway, of a preferred construction of the drive means in accordance with the present invention.
Figure 7:
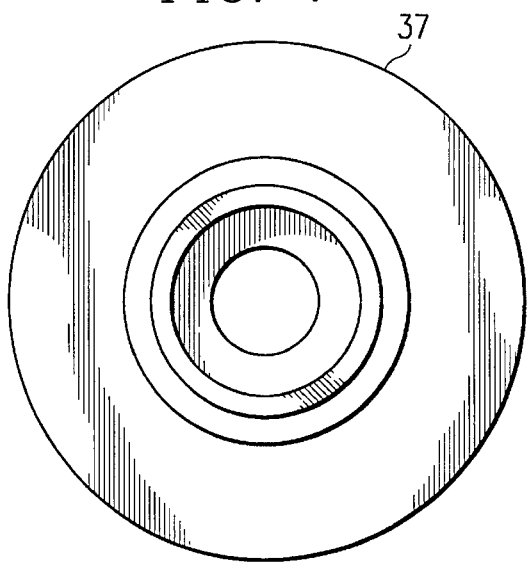
FIG. 7 is a front view of the drive means shown in FIG. 6.

As can be seen in FIGS. 4–5, the lever arm 26 includes the pad 36 having the contact surface 36a adapted to engage the drum attached to the wheel assembly. If desired, the drum may be formed as shown in FIGS. 6–7. As noted above, the drum is fixed statically to the wheel in any convenient manner such as through an axle locking nut or the like. As seen in the figures, the drum 37 includes a drum shaft 54 that slides over the axle 38. The axle lock nut is then attached to the axle 38 so as to press the drum shaft 54 against the hub 22. An additional locking force to the hub 22 by the drum shaft 54 may be obtained using protrusions 46 positioned on the back of the drum 37. The protrusions contact the spokes.

The invention as described herein is useful for various types of wheelchairs, including but not limited to, road racing chairs, and further provides significant and dramatic advantages over prior art designs. The arm is not rigidly attached to the wheelrim as typically used in the art; rather, the arm is attached to the hub through the use of a "freewheel" mechanism. Because the arm is attached in this manner, the user no longer has to release the arm at the end of each forward stroke. Instead, the user simply retains his or her grasp of the arm after a forward stroke, pulls back, then makes another stroke. This operation provides significant advantages when the user has to confront a steep incline or under other circumstances where a forward momentum is lost quickly. When a user of a fixed rim releases the rim to reach back for another forward stroke, he or she must expend another amount of energy to simply regrasp the handle. The amount of energy expended regrasping the rim increases with the steepness of the incline. The present invention completely overcomes these disadvantages of conventional wheelchair designs by maximizing energy input into a forward motion.

The more efficient input of energy created by the floating arm is beneficial to all users of wheelchairs, especially wheelchair users who are physically weak and have trouble going up inclines. For the weaker wheelchair users, such as children and those who are inexperienced users, a push handle may also be attached to the handle. This in turn allows the user to concentrate more energy into making a forward movement with his or her arms, rather than wasting energy concentrating on maintaining a grasp of the handle.

Figure 8:
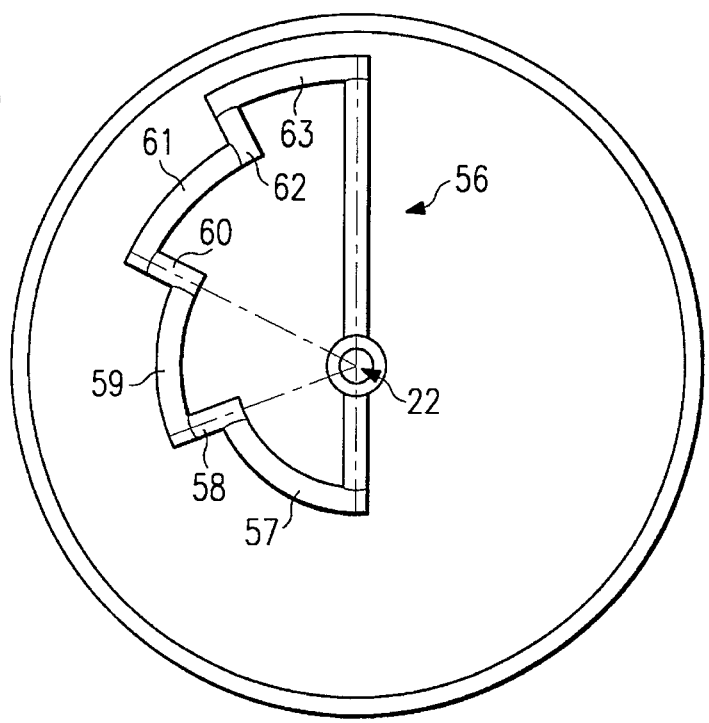
FIG. 8 is a side view of another alternative embodiment of the present invention wherein the lever arm includes a plurality of segments located at different distances from the center of rotation of the drive wheel assembly.

Referring now to FIG. 8, an alternative embodiment of the arm is shown. In this embodiment, the arm 26 includes a linear portion 56 and a plurality of segments 57, 59, 61 and 63. These segments are interconnected by structural members 58, 60 and 62. As can be seen, the angular segments are positioned at various distances from the center of rotation of the drive wheel. The floating handle of FIG. 8 thus affords the wheelchair user a gearing system to let the user engage the leverage which is most appropriate for the terrain being covered. The segments farthest from the center of rotation, e.g., segments 61 and 62, will move at a higher speed than those closer to the center of rotation, e.g., 57 and 59, but require longer strokes to move the wheelchair the same distance that a segment of handle closer to the center of rotation requires. However, the segments farthest from the center of rotation provide more leverage thus requiring less force to push than the segments closest to the center of rotation. Conversely, the handle segments located closer to the center of rotation will move at a slower speed than the handle segments farther away from the center of rotation, but require a shorter stroke to move the wheelchair the same distance that a segment farther from the center of rotation requires. Handle segments farthest from the center of rotation are analogous to a bicycle rider using a smaller gear for a hill, and a handle segment closer to the center of rotation are analogous to a bicycle rider using a larger gear for flat stretches of terrain.

Figure 9:
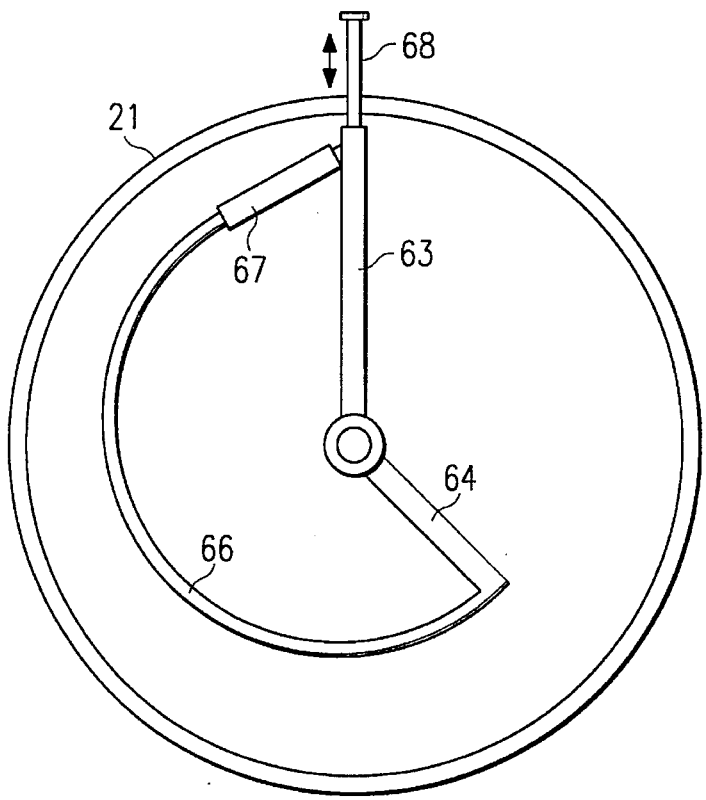
FIG. 9 is a side view of still another alternative embodiment of the present invention wherein the lever arm includes a grip rail which curves helically inward toward the hub of the drive wheel assembly for providing additional leverage variations.

Reference is now had to FIG. 9, which shows yet another embodiment of the handle 26 in accordance with the invention. In this embodiment, the handle includes a first portion 63, a second portion 64 located at an obtuse angle with respect to the first portion 63, and a third portion 66 connected between the outer ends of the first and second portions. The third portion is characterized by a helical curve which approaches the center of rotation in increasing degrees thereby reducing the distance the handle is from the center of rotation. A sliding grip 67 on the handle slides down the curve of the handle reducing leverage at lower, more inward points on the curve, while increased leverage is provided at more outer points of the curve. The first portion 63 may include a slidable lever arm 68 that may be extended beyond the edge of the drive wheel to provide increased leverage.

It should be appreciated by those skilled in the art that the specific embodiments disclosed above may be readily utilized as a basis for modifying or designing other structures for carrying out the same purposes of the present invention. It should also be realized by those skilled in the art that such equivalent constructions do not depart from the spirit and scope of the invention as set forth in the appended claims.

What is claimed is:

1. A wheelchair, comprising:

a structural frame, including a chassis, a seat and a back rest;

a pair of front wheels attached to the chassis and positioned below the seat;

a pair of drive wheel assemblies mounted on the chassis on each side of the seat for independent rotation about a horizontal axis, each drive wheel assembly including a wheel rim and a hub having an axle;

a drum having a diameter smaller than the wheel rim attached to the hub of at least one drive wheel assembly and fixed statically thereto, the drum defining a first laterally facing contact surface;

an arm including a pad having a second laterally facing contact surface for frictionally engaging the first contact surface of the drum; and means for rotatably supporting the arm on the axle of the drive wheel assembly and including pivot means for enabling the arm to be moved between first and second lateral positions;

wherein when the arm pivots from the first to the second lateral position, the second contact surface of the pad frictionally engages the first contact surface of the drum to enable a person seated in the wheelchair (i) to propel the drive wheel assemblies forward using the frictional forces between the first and second contact surfaces by rotating the arm in a first direction, (ii) to propel the drive wheel assemblies backwards using the frictional forces between the first and second contact surfaces by rotating the arm in a second direction or (iii) to brake the wheelchair using the frictional forces between the first and second contact surfaces.

2. A drive/brake assembly for a wheelchair, the wheelchair having a chassis, a seat, a back rest, a pair of front wheels attached to the chassis and positioned below the seat, and a pair of drive wheel assemblies mounted on the chassis on each side of the seat for independent rotation about a horizontal axis, each drive wheel assembly including a wheel rim, a tire, and a hub having an axle, the drive/brake assembly comprising:

a drum having a diameter smaller than the wheel rim adapted to be attached to the hub of at least one drive wheel assembly and to be fixed statically thereto, the drum defining a first contact surface;

an arm including first, second and third portions, each portion having inner and outer ends, the second positioned at an angle obtuse to the first portion and the third portion connected between the outer ends of the first and second portions, the arm further including a second contact surface for frictionally engaging the first contact surface of the drum; and means for rotatably supporting the arm on the axle of the drive wheel assembly and including pivot means for enabling the arm to be moved between first and second lateral positions;

wherein when the arm pivots from the first to the second lateral position, the second contact surface of the arm frictionally engages the first contact surface of the drum to enable the person seated in the wheelchair, (i) to propel the wheelchair forward by rotating the arm in a first direction about the horizontal axis, (ii) to propel the wheelchair backwards by rotating the arm in a second direction about the horizontal axis or (iii) to brake the wheelchair due to frictional engagement between the first and second surfaces by maintaining an inward force on the arm in the second lateral direction.

3. The drive/brake assembly as described in claim 2, wherein the arm includes a top and bottom.

4. The drive/brake assembly as described in claim 3, further including a counterbalance weight attached to the bottom of the arm.

5. The drive/brake assembly as described in claim 2, wherein the arm includes a linear portion and a plurality of segments interconnected by a plurality of structural members, such that the segments are positioned at various distances radially from the center of rotation of the drive wheel assembly.

6. The drive/brake assembly as described in claim 2, wherein the third portion approaches the center of rotation of the drive wheel assembly in increasing degrees, thereby reducing the distance the arm is from the center of rotation.

7. The drive/brake assembly as described in claim 2, further including a lever extending beyond the outer end of the first portion and attached thereto.

8. A drive/brake assembly for a wheelchair, the wheelchair including a drive wheel assembly having a wheelrim, a hub and an axle, the drive/brake assembly comprising:

a drum having a diameter smaller than the wheelrim adapted to be attached to the hub of the drive wheel assembly and to be fixed statically thereto, the drum defining a first laterally facing contact surface;

a drive arm including a pad defining a second laterally facing contact surface for frictionally engaging the first contact surface of the drum, the drive arm being rotatably connected to the axle of the drive wheel assembly in a horizontal axis and pivotably connected between first and second lateral positions along a lateral axis; and wherein when the drive arm pivots from the first to the second lateral position, the second contact surface of the pad frictionally engages the first contact surface of the drum to enable the following (i) rotating the drive wheel assembly forward using the frictional forces between the first and second contact surfaces by rotating the arm in a first direction about the horizontal axis, (ii) rotating the drive wheel assembly backward using the frictional forces between the first and second contact surfaces by rotating the arm in a second direction about the horizontal axis or (iii) braking the wheelchair by maintaining the frictional force between the first and second contact surfaces by holding the arm in the second lateral position.

* * * * *